(12) United States Patent
Ledet (10) Patent No.: US 10,073,920 B1
(45) Date of Patent: Sep. 11, 2018

(54) SYSTEM AND METHOD FOR AUTOMATIC POSTING TO MEDIUMS WITH A USERS CURRENT INTERESTS

(75) Inventor: David Gerard Ledet, Allen, TX (US)

(73) Assignee: Open Invention Network LLC, Durham, NC (US)

( * ) Notice: Subject to any disclaimer, the term of this patent is extended or adjusted under 35 U.S.C. 154(b) by 352 days.

(21) Appl. No.: 13/047,173

(22) Filed: Mar. 14, 2011

Related U.S. Application Data (60) Provisional application No. 61/317,805, filed on Mar. 26, 2010.

(51) Int. Cl.
*G06F 7/00* (2006.01)
*G06F 17/00* (2006.01)
*G06F 17/30* (2006.01)

(52) U.S. Cl.
CPC ................. *G06F 17/3089* (2013.01)

(58) Field of Classification Search
CPC ......... G06F 17/30864; G06F 17/30867; G06F 17/30572; G06F 17/30997; G06F 17/30657; G06F 17/30011; G06F 17/30029; G06F 17/30038; G06F 17/30041; G06F 17/3002; G06F 17/30035; G06F 17/30056; G06F 17/3089; G06F 17/3053; G06F 17/212; G06F 3/0483; G06F 17/30905; G06F 17/30274; G06F 17/30377; G06F 17/3012; G06F 19/3406
USPC ....... 707/899; 715/810; 455/456.1; 709/219; 369/30.1; 704/251
See application file for complete search history.

(56) References Cited

U.S. PATENT DOCUMENTS

| | | | |
|---|---|---|---|
| 6,708,176 B2* | 3/2004 | Strunk et al. | |
| 6,907,397 B2* | 6/2005 | Kryze et al. | 704/251 |
| 8,112,476 B2* | 2/2012 | Polis | H04L 67/2833 |
| | | | 709/201 |
| 2005/0261990 A1* | 11/2005 | Gocht | G06Q 30/02 |
| | | | 707/758 |
| 2006/0206585 A1* | 9/2006 | Lubin et al. | 709/219 |
| 2007/0025194 A1* | 2/2007 | Morse et al. | 369/30.1 |
| 2007/0078849 A1* | 4/2007 | Slothouber | G06Q 30/02 |
| 2007/0172155 A1* | 7/2007 | Guckenberger | G06F 17/30247 |
| | | | 382/305 |
| 2008/0091717 A1* | 4/2008 | Garbow et al. | 707/104.1 |
| 2008/0215607 A1* | 9/2008 | Kaushansky | G06Q 30/02 |
| 2009/0106202 A1* | 4/2009 | Mizrahi | 707/3 |
| 2009/0319947 A1* | 12/2009 | Wang et al. | 715/810 |

(Continued)

OTHER PUBLICATIONS

Apple, iPhoto, http://www.apple.com/ilife/iphoto/, Apr. 27, 2010.
BlogJet, http://'www.codingrobots.com/glogjet/, Apr. 27, 2010.

*Primary Examiner* — Te Y Chen (57) ABSTRACT

An application can execute on one or more user devices that can scan the user's local and remote activity related data, such as internet surfing history, emails, etc, to determine current interests of the user. The data can be processed into categories and categories that have a frequency of activity that satisfies a requirement threshold can be said to represent a current interest of the user. The data can be processed to extract content for a content update to a user account, such as an RMTS account or blogging account of which the user is a member. The content update can use published APIs for the respective mediums to automatically post the content update to the medium.

15 Claims, 6 Drawing Sheets

(56) References Cited

U.S. PATENT DOCUMENTS

| | | | |
|---|---|---|---|
| 2011/0065451 A1* | 3/2011 | Danado et al. | 455/456.1 |
| 2011/0161085 A1* | 6/2011 | Boda | G06Q 30/02 |
| | | | 704/260 |
| 2011/0256889 A1* | 10/2011 | Polis | H04L 67/02 |
| | | | 455/456.3 |
| 2012/0021733 A1* | 1/2012 | Lin et al. | 455/418 |
| 2012/0063367 A1* | 3/2012 | Curtis et al. | 370/270 |
| 2012/0066231 A1* | 3/2012 | Petersen et al. | 707/748 |
| 2012/0197871 A1* | 8/2012 | Mandel | G06F 17/30994 |
| | | | 707/722 |
| 2012/0221643 A1* | 8/2012 | Polis | H04L 67/02 |
| | | | 709/204 |
| 2013/0024787 A1* | 1/2013 | Polis | H04L 67/02 |
| | | | 715/753 |
| 2013/0159223 A1* | 6/2013 | Bahl | G06N 5/04 |
| | | | 706/12 |

\* cited by examiner

SYSTEM AND METHOD FOR AUTOMATIC POSTING TO MEDIUMS WITH A USERS CURRENT INTERESTS

CROSS REFERENCE TO RELATED APPLICATIONS

This application claims priority to an earlier filed U.S. Provisional Application Ser. No. 61/317,805, entitled Automatic Posting to Mediums with A User's Current Interests, which was filed on Mar. 26, 2010, the entire contents of which are hereby incorporated by reference and relates to provisional patent application No. 61/317,788, filed Mar. 26, 2010, entitled Dynamic Collaboration and Document-Management Platform, and patent application Ser. No. 12/770,981, filed Apr. 30, 2010, entitled Dynamic Creation, Data Population, And Communication Establishment Across Various Mediums, and patent application Ser. No. 12/505,109, filed Jul. 17, 2009, entitled System, Method, And Computer-Readable Medium For Automatic Query And Order Processing Via The Internet, and patent application Ser. No. 12/913,848, filed Oct. 28, 2010, entitled Method And System For Generating An Electronic Medium, and patent application Ser. No. 12/913,852, filed Oct. 28, 2010, entitled Method And System For Searching Network Resources To Locate Content, and patent application Ser. No. 12/913,854 filed Oct. 28, 2010, entitled Method And System For Prioritizing Content Collected Automatically, and patent application Ser. No. 12/913,856 filed Oct. 28, 2010, entitled Method And System For Communicating With Internet Resources To Identify And Supply Content For Webpage Construction, the entire contents of each of these applications are incorporated by reference herein.

FIELD OF THE INVENTION

This disclosure relates to systems and methods for creating and updating content on various mediums.

BACKGROUND OF THE INVENTION

In present day communications technology, there are a variety of mediums on which a user can create a presence. These mediums include a webpage, social networking presence, instant messaging (IM) accounts and the like. In the present Applicant's co-pending application Ser. No. 12/770,981, the entire contents of which are incorporated herein by reference, there is described a system and method for processing a user's file system, including local and remote files, to determine the interests of the user and to use these interests as the basis for creating new mediums based on a particular identified interest. The mediums that could be created include a web page, a blog, a twitter message, an IM, a social networking application, etc.

To enhance a user's presence and popularity, it can be important to ensure that these mediums are dynamic by constantly changing and updating the content of the medium in order to attract attention of other users and acquaintances to the medium.

What is required is an improved system and method for creating content to post to mediums with which the user is associated.

SUMMARY OF THE INVENTION

An application can execute on one or more user devices that can scan the user's local and remote activity related data, such as internet surfing history, emails, etc, to determine current interests of the user. The data can be processed into categories and categories that have a frequency of activity that satisfies a requirement threshold can be said to represent a current interest of the user. The data can be processed to extract content for a content update to a user account, such as a RMTS account or blogging account of which the user is a member. The content update can be automatically posted to the respective mediums, for example by using published APIs for the respective mediums.

In one aspect of the disclosure, there is a provided a method for automatically generating content entries for a user accounts. Local and/or remote user data may be processed to determine one or more current interests of a use. A user account relating to a current interest may be determined and a content entry for the current interest may be generated and posted to the user account.

In one aspect of the disclosure, there is a provided a communications enabled device executing an application on at least one processor of the device. The application may be configured to maintain an association between one or more topics of interest of a user and one or more mediums, process user data comprising at least one of local user data and remote user data to determine a current interest of the user, determine a medium associated with the current interest by referencing the maintained association, generate a content entry for the current interest from the user data, and provide the content entry to the determined medium.

In one aspect of the disclosure, there is a provided a method for photo sharing. A photo is captured a communications enabled device. A context of the photo may be determined and used to derive supplemental data regarding the photo. A content entry can be generated that uses the photo and the supplemental data so that the content entry can be provided to an appropriate medium.

BRIEF DESCRIPTION OF THE DRAWINGS

Reference will now be made, by way of example only, to specific embodiments and to the accompanying drawings in which.

DETAILED DESCRIPTION OF THE INVENTION

The present disclosure continues the automating of the processes described in the Applicant's earlier disclosure Ser. No. 12/770,981, referenced above, in the creating of mediums on the Internet using the user's data received from the local and remote systems. The embodiments to be described below extend the intuitive functionality of automatically submitting entries into established mediums, and continually monitoring the user's interests to relate them to the remote sites. Advantages of these embodiments include:

utilizing the data obtained from local and remote systems of the user to automatically post entries (blogs, messages, profile updates, etc.) on the websites where the user is a member;

keeping track of the user's activity and creating temporary entries that are kept and eventually posted if the application is sure that there is an interest in the entry/content; and ongoing management of user's interests FIG. 1 displays a network architecture on which the methods to be described below may be embodied. A user utilizing a client machine 103 may access an application (in the form of software, for example) to be downloaded from a server 104 or that currently resides on the client's machine 103. The client machine can be any of a mobile laptop device 106, a personal desktop computer 108, or a wireless device 110, such as a mobile phone, smart phone, etc. The client machine 103 is connected to the Internet 102.

Figure 1:
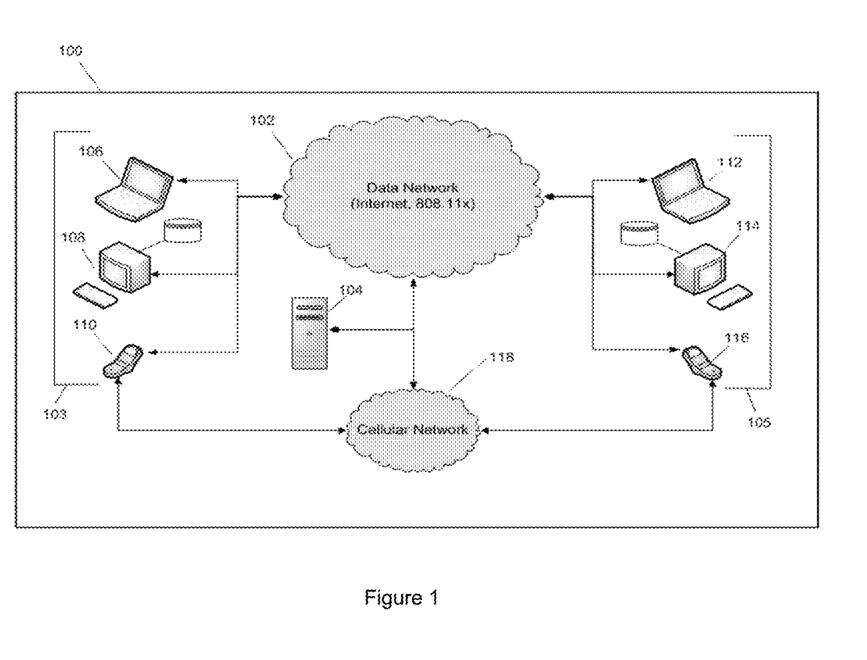
FIG. 1 shows a network in accordance with an embodiment of the present disclosure.

By way of example only, it is assumed that the application resides on the server 104 but could reside completely or in a distributed manner on one or more of the devices or networks in FIG. 1. The user of the application will be accessing the client machine 103, and connecting to a remote machine 105, which includes any of a mobile laptop device 112, a personal desktop computer 114, a wireless device 116 or any other suitable networked device. The remote device 105 is connected to the Internet 102. If the client is on a wireless device 110/116, the system 104 can be accessed via the Internet 102, or the Wireless Network (such as a Cellular Network, for example) 118. It should be noted that other types of devices, in addition to devices 103 and 105, might be used with the present invention. For example, a PDA, an MP3 player, a gaming device (such as a hand held system or home based system, etc) that can also transmit and receive information could be used with the present invention.

Figure 2:
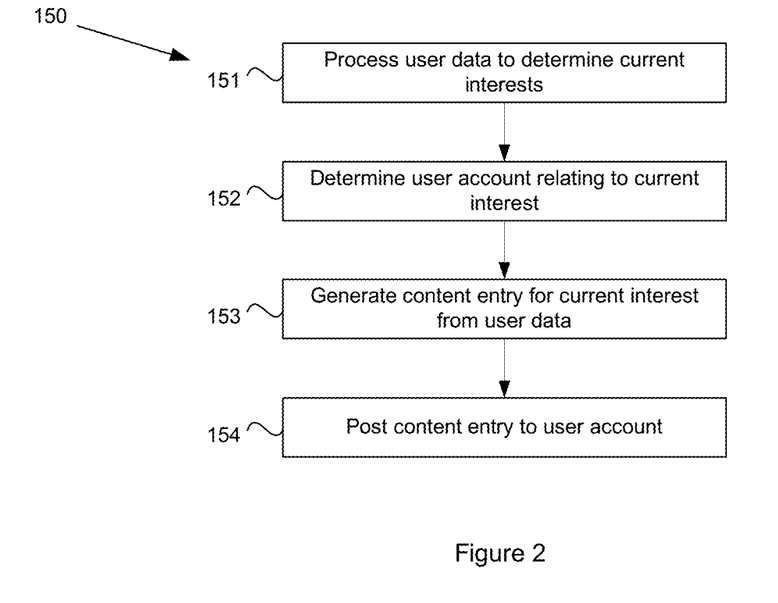
FIG. 2 shows a method for automatically generating content updates.

A process for automatically generating content entries is depicted in the flowchart 150 of FIG. 2. At step 151, the application executing on the user's computer device system processes the user's data to determine current interests for the user. The application then determines a relevant user account for one or more of the current interests (step 152) and generates a content entry from the user data for the current interest (step 153). At step 154, the content entry is posted to the user account.

The application monitors the activity of the user, and interfaces with websites that the user has accounts with to introduce new content that reflects the user's current activity. A process for processing the user's local and remote data is depicted in the flowchart 200 of FIG. 3. The application is begun 201, and a scan is begun of the user's local and remote data 202 in a similar manner to that described in the Applicant's co-pending application Ser. No. 12/770,981, referenced above and described in more detail below. The results of the scan, which reflect temporary interest categories of the user, are added to a Temporary User Interests File 203. The TUIF is merged with a Permanent User Interests File (PUIF) 204 and the PUIF is updated 205 in a manner to be described in more detail below. The PUIF is then processed 206 whereby categories are determined and weights are assigned to the categories to account for new data from the TUIF file. The weights represent the frequency with which a particular content category appears in the user data.

Figure 3:
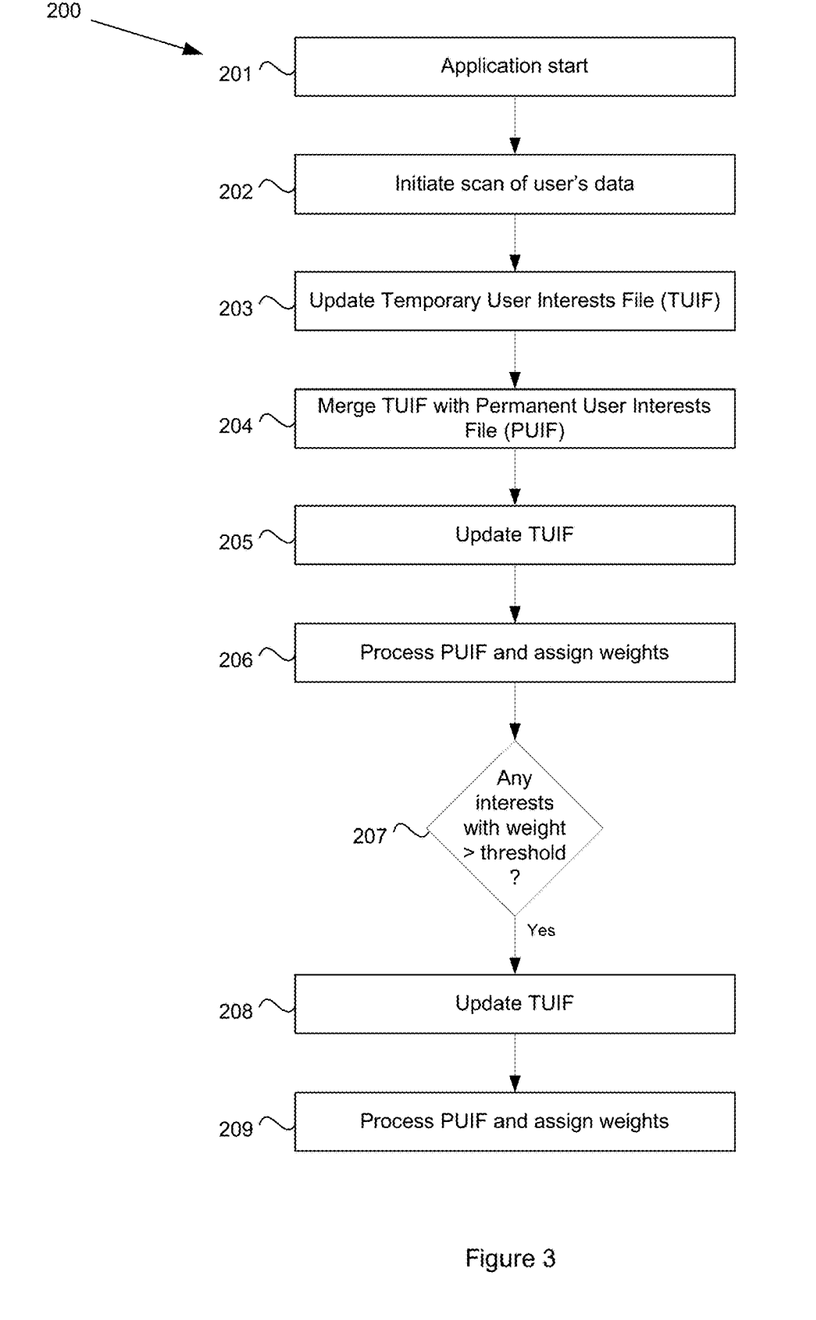
FIG. 3 shows a method for processing a user's local and remote data.

If the weights assigned to a category exceed a threshold requirement (determination 207), then that category can be said to reflect a known and/or current interest of the user. Accordingly, a content entry may be created for that interest 208 using data obtained from the interest scan, the TUIF and/or the PUIF. The content entry is then posted to a medium on which the user has an account 209, such as a blog or RTMS.

The application monitors the user's current activity, and interfaces with websites that the user has accounts with to introduce new content that reflects the user's current interests.

In the Applicant's earlier patent application Ser. No. 12/770,981, there was described a functionality to determine the user's current interests by querying the user's local file system and remote systems. For the presently described application, the current user's activity may be obtained in the same manner, though the timing of the data query may differ.

In one embodiment, a process can be started in the background of the user's system, e.g. on user device 103, that runs at all times. Current programming languages contain classes and managers necessary to implement the starting and monitoring of background processes. Managers allow the programming of background processes that can be setup to use a specific ratio of CPU processing for processes that are registered to it. The background process can also be started in a batch file that is executed prior to the initialization of the application. Inside the batch file, the background process is begun by using a command (such as the "Start" command in Windows) which tells the Operating System that the application is to run in the background and allows the current window to be used. The process can also be started by associating a symbol or sound with the application. For example, placing the "&" symbol after the application name runs the application in the background.

In an alternative embodiment, the user's file system may be scanned when the application is executed. While this implementation has the benefit of not executing at all times, the data will not be as current as implementing the background process. In this implementation, the local file system is scanned in the similar method as described in Ser. No. 12/770,981, but the scan is begun when the application is started, and is part of the initialization of the application.

In one embodiment, the application may generate the TUIF by scanning only a select portion of the user's data, such as only the current data. It is not always useful to have all of the user's data scanned at every query, but only the data that is new (that has a timestamp greater that the last scan). A GUI window (not shown) allows the user to configure the timeframe wherein the scanning of the data occurs. Also included in the GUI window, specific elements of the user's data can be configured to be scanned or not scanned (for example only the user's cookies) at the next query.

Figure 4:
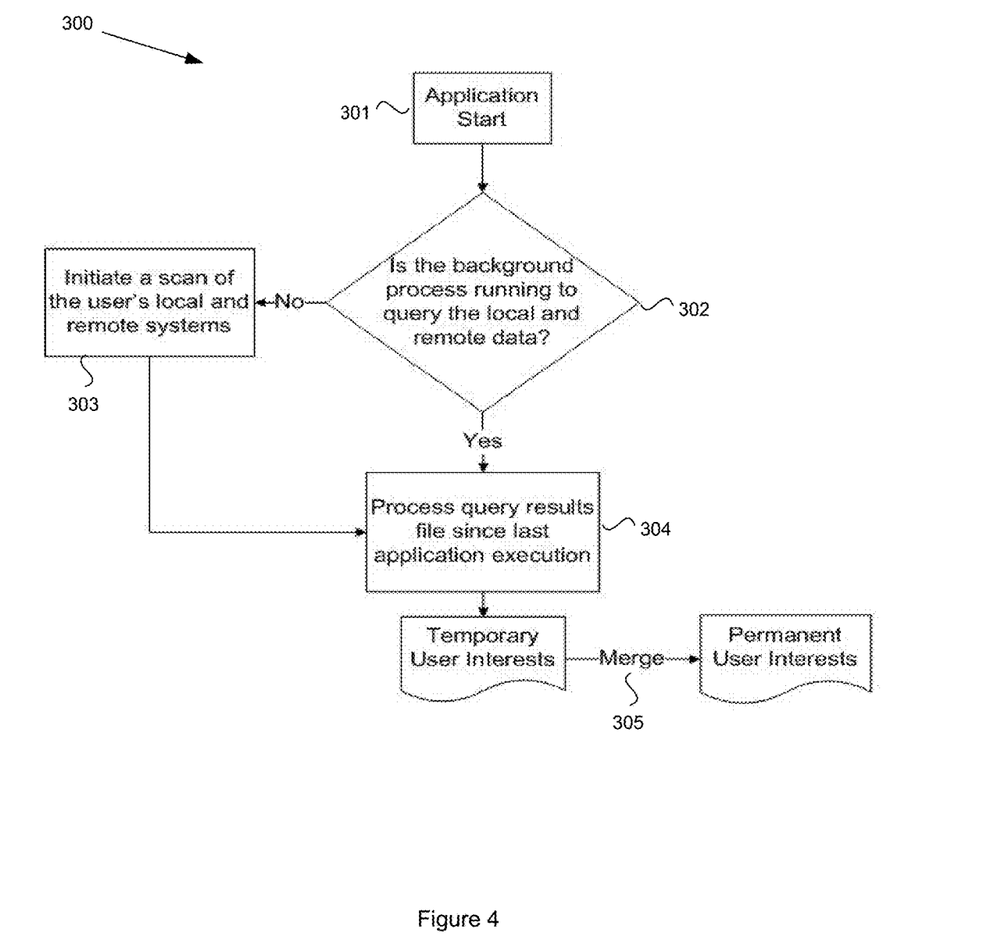
FIG. 4 shows a method for determining current interests of a user.

A process for determining the user's current interests is depicted in the flowchart 300 of FIG. 4. At step 301, the application commences on a user device 103. The user device may be a networked device and may have access to a file system of the user including files on the local device, files on a local network of the user (e.g. alternative devices 106, 108. 110) or remote file systems accessible through the networks 102, 118. If the application is not running as a background process (determination 302), then a query is performed (step 303) that scans of the user's local and remote systems.

After querying the user's local and remote systems, the query results are analyzed (step 304) and key words are sought out that reflect the current interests of the user. The results from both the local and remote systems are stored in a temporary text file called the Temporary User Interests File (TUIF), which can hold text, images, video, etc.). This TUIF contains the results of each scan of the user's data since the previous scan occurred, and contains the data from the user including:

- Ads Clicked—the URL of the websites and any text, images and/or video associated with the advertisement;
- Ads Served—the URL of the websites and any text, images and/or video associated with the advertisement;
- Request Searches—the text that the user entered into the search engine;
- Groups—the group titles and any text, images and/or video associated with the group description;
- Emails/IMs/SMSs—the title and body of the emails and the data in the IMs and SMS msgs;
- Calendar—the title of the calendar events and any associated text describing the event such as a location, date, time, duration, call-in data, participants, etc.;
- Surfing History—the URL of the websites and any associated description stored about the websites as well as amount of time spent on the site, on each page of a site, etc.;
- Location—the most specific description of the location that can be determined based on an IP address, a known address, product ordering history, etc.;
- Games—the title of the games and any associated descriptions;
- Video—the title of the video and any associated descriptions; and
- GPS—the most specific description of the location that can be determined.

Other elements that may be searched to provide an indication of a user's current interests may be apparent to a person skilled in the art and are intended to be encompassed herein.

One source of information to be scanned is the user's online surfing on the user's computer. Most web browsers retain Internet surfing information in the form of cache files, or cookies stored on the user's computer. These files can be scanned to determine information that will aid the application in creating a dynamic web page.

Other methods can be employed to gain an understanding of the user's previous Internet surfing history. Google and Yahoo, for instance, offer free services that users can utilize to perform email capabilities, manage groups, search the web, manage advertisements, manage calendar activities, manage documents, as well as many other services.

At step 305, the data in the TUIF is merged with a Permanent User Interests File (PUIF) which is a permanent file containing the known interests of the user over time and stored in a file on the user's local file system. The PUIF is, in essence, produced from categories that linger through successive iterations of the TUIF. Merging may be performed as follows. The data in the TUIF file is converted into indexable/searchable tokens utilizing an API such as the Java Package: org.apache.lucene.analysis. This package implements tokenization—namely breaking of input text into small indexing elements or tokens. This Package implements tokenization—namely breaking of input text into small indexing elements or tokens. Some of the other analysis tools included in the Java package include:

- Stemming—Replacing the words by their stems. For instance with English stemming "bikes" is replaced by "bike"; now query "bike" can find both documents containing "bike" and those containing "bikes".
- Stop Words Filtering—Common words as "the", "and" and "a" rarely add any value to a search. Removing these shrinks the index size and increases performance. It may also reduce some "noise" and actually improve search quality.
- Text Normalization—Stripping some or all accents and other character markings can make for better searching.
- Synonym Expansion—Adding in synonyms at the same token position as the current word can mean more accurate matching when users search with words in the synonym set.

Once the TUIF is tokenized, it is analyzed for repetitious words, or apparent categories, and the TUIF file is organized into categories. These categories are compared with categories found in the PUIF file and weights are updated for each of the existing categories in the PUIF file. The current interests are weighted in the merged PUIF to determine the level of interest the user has in the subject.

By way of example, a user may be a baseball fan. The user's local and remote data, reflecting web surfing habits, blogging, forum contributions, emails, etc may reveal several data items relating to baseball. If there is sufficient baseball data to satisfy a threshold weighting, then baseball may be determined to be at least a temporary interest of the user. If, after successive iterations of the process shown in FIG. 3 the baseball category lingers, then baseball will remain as a permanent interest in the PUIF.

For instance, if the user has sent an email regarding the New York Yankees baseball team, the weight would be minimal on that subject but the data would remain in the TUIF or PUIF until expiry of the data. Thus, if in addition to the email, the user had also sent two messages via a real-time messaging service (RTMS), and visited a webpage corresponding to the Yankee baseball team, for example, the weight would be higher.

The weight can be used reflect the number of times the interest is encountered in the user's data. If the weight is greater than a threshold, e.g. 3 (for example), then it is assumed that there is a high level of interest in that item and thus that item can be confirmed as a known interest of the user. If the weight is below the threshold, then the element may be stored, along with the timestamp in which the data was encountered.

The data in the PUIF may be set to expire in a configurable timeframe. This timeframe may be configured by the user via a GUI window (not shown).

If analysis of the merged PUIF file indicates any categories with a weight above the required threshold, then a content entry may be created and submitted to the user's related RTMS or blogging sites. The scan and/or update creation process may occur on a user definable timeframe (set by the user in the configuration window—not depicted).

Figure 5:
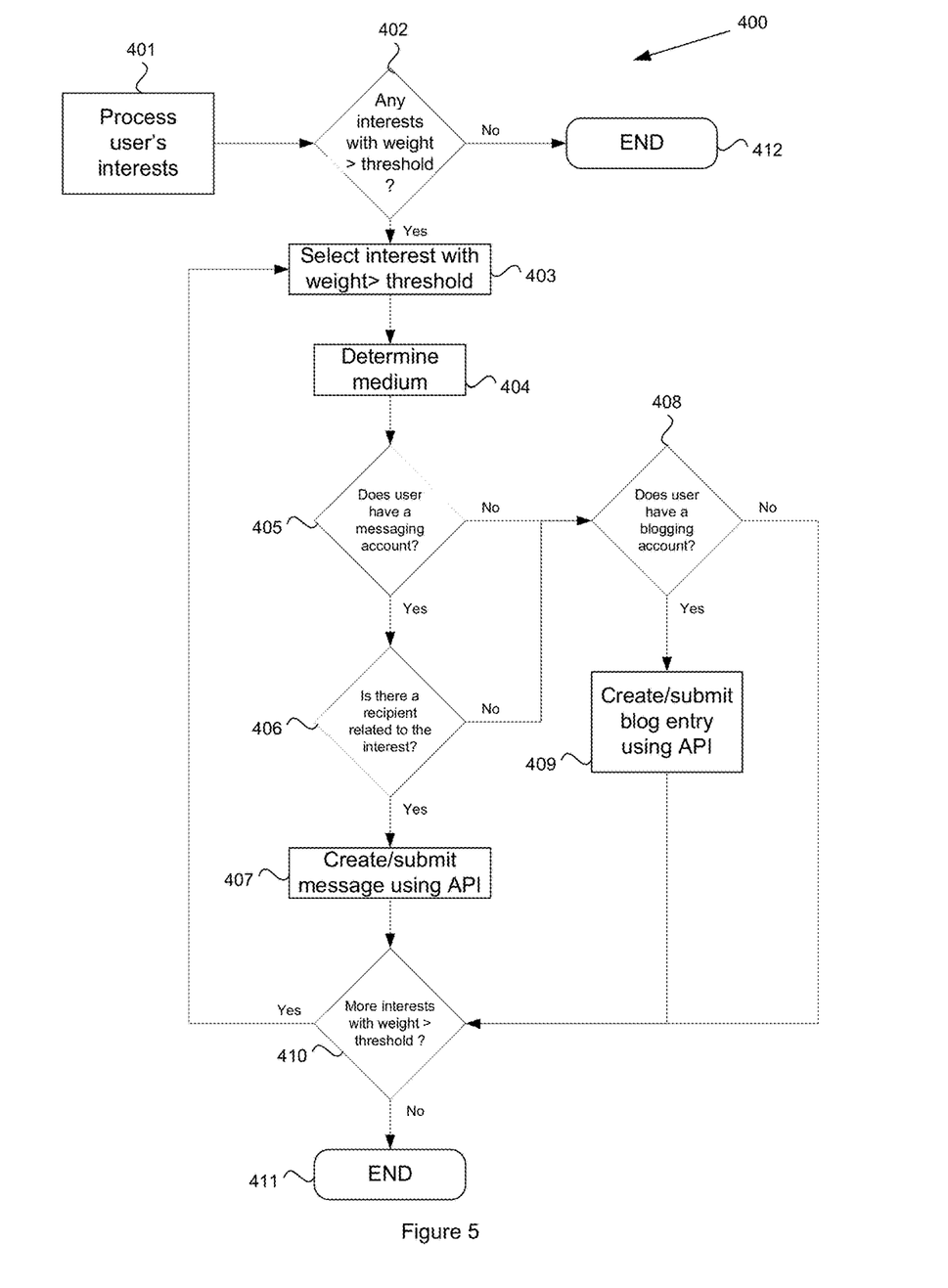
FIG. 5 shows a method for processing the current interests to generate a content update.

An example of the content submission process is depicted in the flowchart 400 of FIG. 5. At step 401, the merged PUIF is processed to assign weights to categories, for example using the tokenization process described above. At step 402, a determination is made as to whether there are any interests in the PUIF with a weight greater than the threshold, e.g. 3. If not, then the process ends 412. Otherwise, outgoing content entries may be created by the application utilizing the interests stored in the PUIF. A first interest satisfying the threshold requirement is selected 403. For this interest, a process is commenced to determine the appropriate medium to which to post a content update. In one embodiment, this determination may be made by reference to a Topic Data File (TDF).

The application monitors the topics that the user has interests in and keeps track of them in a Topic Data File (TDF) that is accessible on the user's file system when the application is executing. The application has access to the TDF through local file access methods that are standard among applications running on a user's local computer. This TDF file includes entries that reflect interactions between the user of the application, and remote users (UserB). This file is written to the user's file system by the application. At application initialization, a check is made if the TDF file is existent. If not, a new TDF file is created. If the TDF file exists, the file is read into the memory of the application and the TDF file is updated if needed. When modifications are made to the data in the TDF, the application writes the updated data to the user's TDF file on the user's file system.

The TDF is a file containing a historical representation of what information is related to which topics and assists the application in posting to the mediums, such as the blogs and real time messages, that are reflective of the user's interests.

For example, as seen in Table 1, there is a column entitled "User". This column indicates the remote user (for example, UserB) wherein the entry pertains to. Each of the entries in the TDF table pertain to interactions between other users (UserB), and the user of the application.

Another column entitled "Timestamp" indicates the date and time that the entry was made in the TDF table.

Another column entitled "Remote Application" indicates the particular application that was interacted with for the recorded entry.

The column entitled "Topic" lists the category that the entry pertains to.

Lastly, a column entitled "SubTopic" depicts a particular string in the remote application that pertains to the topic. The sub-topic may change according to the user's interactions in the remote application with other users (UserB) over time New topics may be entered into the table according to the topics encountered with various users (UserB) over the interactions in the application.

For example, the TDF may contain the entries:

TABLE 1

Topic Data File

| UserB | Time stamp | Remote Application | Topic | SubTopic |
|---|---|---|---|---|
| joe123 | 02112009-184022 | RTMS | Major League Baseball | Red Sox |
| bob111 | 03022009-122234 | XYZBlog | Major League Baseball | Yankees |
| Dave333 | 11242009-083954 | Social Networking | Music | Alternative Rock |

Referencing Table 1, the first entry indicates that the user of the current invention interacted with a UserB, joe123 through a RTMS remote application. The topic of interest in the interaction was Major League Baseball, and the Red Sox team was discussed.

To determine the medium/site (step 404), the application queries the TDF to determine if the category is associated with a messaging account (query 405). If so, the application determines from the TDF whether there is a recipient for the message (query 406). If there is a recipient for the message, then a message is created using the appropriate published APIs for an RTMS service related to the current user and posted to the site 407. The published Messaging APIs are utilized to automatically submit an outgoing message to the recipients that had previously received messages from the user.

If a message cannot be sent (e.g. no account or no recipient), then a query is made 408 to the TDF to determine if the user has a blogging account relating to the category. If so, the appropriately published APIs are utilized to create a blog update and post the update to the site 409.

Once the message or blog update has been posted, a check is made 410 for more interests from other remote users (UserB) that satisfy the threshold requirement. If more interests require content updates, the process returns to step 403 for the next interest. Otherwise, the process ends 411.

For each content update, e.g. RIMS message or blog entry, the update is validated against the TDF to determine if the update relates to the topic and sub-topic stored in the TDF. If the update is validated, it is sent to the remote site.

The embodiments describe updates via messaging protocols and blogging. Software engineers well versed with current APIs will be able to determine other interactions between the presently described application and remote applications (i.e. social networking applications, Short Messaging Service (SMS) applications, etc).

The content for the messages, updates, etc can be obtained from data in the TUIF and/or PUIF. The data utilized in the content updates include:
  email sent—data in the to list, copy list, body and/or subject line of the email pertaining to the topic
  blogs submitted—title and body of the blog.
  outgoing messages—body of message and its recipient
  calendar—event data (title, date, location)
  group—title and body For example, if the application acknowledges that an email was sent by the user of the current application, an examination of the email is made to determine the recipient (s), subject, and the content of the outgoing message. This examination is more completely described above, where the analysis of the text is tokenized/weighed to determine the context of the data. This data is analyzed and an entry is made to the TUIF reflecting the recipient, timestamp, remote application (email application), topic and subtopic.

Another example includes an entry made by the user to a blog. The title and body of the blog entry is analyzed and an entry is made to the TUIF with the context of the blog entry inserted into the topic/subtopic fields of the TUIF. This examination is more completely described above], where the analysis of the text is tokenized/weighed to determine the context of the data.

If multiple entries are made on a particular category by the user with various remote applications (for example, entries are made regarding baseball in emails, blogs, and photos), each of the entries are made regarding the respective remote applications in separate lines in the TUIF.

By scanning the user's data and thus staying current with the user's interests, the application places the interests in various levels. For example, the application notices that the user has sent an email regarding a player from the New York Yankees. In the temporary blog entry, the baseball player becomes the lowest level. The application can now ascertain that the user is a sports fan, a major league baseball fan, a Yankee fan, and has some opinion about one of the players on the Yankees team.

As time goes on (over the next hour(s), day(s), weeks, etc.) the user writes about the Boston Red Sox X times and the NY Yankees Y times, with X>>Y. In addition, the application notices the user is accessing www.bostonredsox-.com quite often. The application determines that the lowest level should be the Boston Red Sox and not the NY Yankees. As such, the application begins to provide any related information contained in an email or other medium to the blog and in response to a message.

In referencing the TDF, the application is able to ascertain that even though the user data query determines that user joe123 has a high level of interest in the Yankees baseball team, the user actually is a fan of the Red Sox, and should utilize this information when posting to a Blog or to a RTMS acquaintance.

By building and interacting with the TUIF, the PUIF, and the TDF, the application builds (over time) a user schema that contains an entry in the Topic Data File for each of the entities that the user has correspondence. The entry records the likes and dislikes of the respective entities. This intelligence allows the application to make wise decisions when corresponding with remote sites and acquaintances.

The presently described application may reside on the server (FIG. 1, 104). Another component of the application may reside on the user's mobile device (FIG. 1, 110). These two programs communicate with each other through various protocols well understood in the mobile device programming community. The communication can be through simple sendData( ) and receiveData( ) in the Java programming language context, or HTTP GET and POST where XML data is sent across the network between the server and mobile device.

In one embodiment, the application that executes on the device of the user may provide a method for photo sharing. An example of such a method is depicted generally in the flowchart 500 of FIG. 6. At step 501, a photo is captured on a device, such as a communications enabled camera, mobile phone, smart phone, tablet, etc. The application then determines a context for the photo (step 502). A context may be a time at which the photo was taken, a location at which the photo was taken (e.g. if the user device is location aware), etc. The context can then be used to determine supplemental data for the photo (step 503). For example, if the device is location aware and the context is a location of the device, the device may access third party information sources to first determine an address at which the device is located, e.g. a stadium, venue, holiday resort, etc, and then determine if there is an event occurring at that address. If the context is a time context, the application may access an appointment schedule, electronic diary or other information sources of the user to determine what the user is doing at the determined time.

Figure 6:
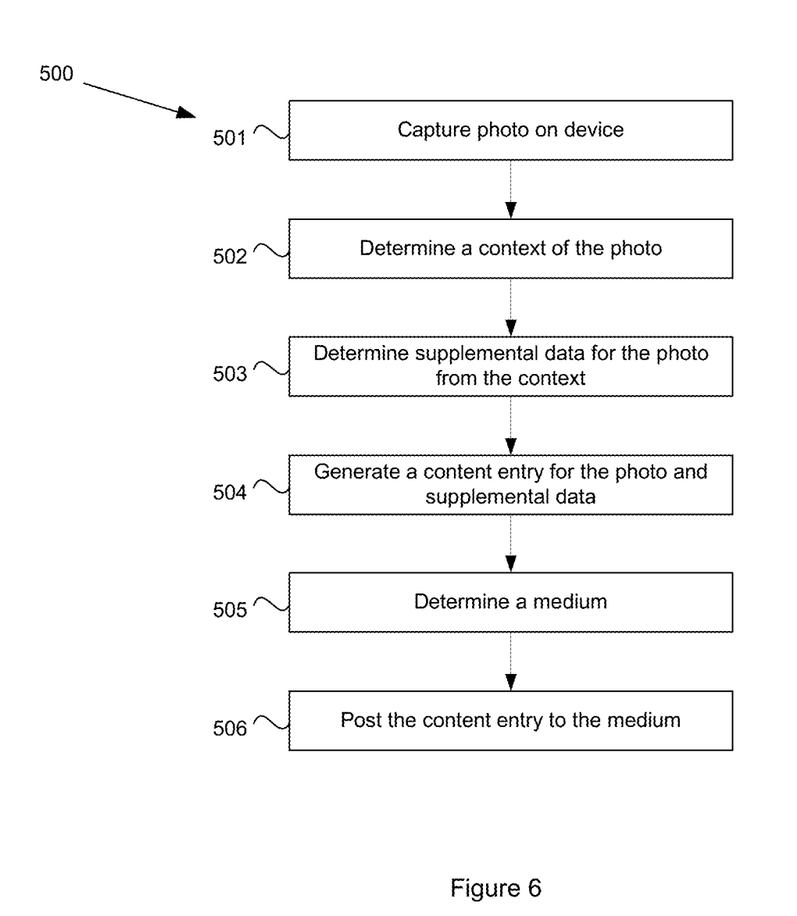
FIG. 6 shows a method for photo sharing.

Using the supplemental data, a content entry can be determined for the photo (step 504). The supplemental data and/or photo may indicate a topic for the content entry. At step 505, a medium for the content entry can be determined. For example, the topic indicated by the photo or supplemental data can be provided to the Topic Data File to determine a medium associated with the topic as well as any recipients if relevant. At step 506, the content entry may be provided to the determined medium. In this automated photo sharing process, all the user has done is take the photo.

In a specific example, the application scans the user's data on a certain day between a specific period and learns that the user will be at a sporting event on a specific day and time. The application, executing on a mobile device of the user, automatically begins to post entries to various mediums with information about the users' location and information about the location itself embedded in the entry. For example, the user may be at a NY Yankees game and has taken a photo during the game.

The entry of the photo in all of the users' mediums (or all of the mediums that should post content related to the entry) would include the following supplemental information automatically embedded within or near the photo: "This photo was taken during the 6th inning at Yankee Stadium with the Yankees ahead 4-2."

The application, having access to many third party information sources such as sports websites, etc. and utilizing published APIs, has the ability to determine the statistics of the game that the user is attending.

The mobile device application communicates with the application running on the server receiving any statistics pertaining to the baseball game. This information is included in the text that is automatically tagged with the user's photo. For example, based on time photo was taken, the application can reference websites relating to the game to gather additional content to include in an update post, such as who was batting, and provide the players name utilizing the APIs available from sports web sites. The URL link can also be provided for additional information about the player such as, stats, etc. Content may be provided as absolute content or can be hyperlinked, e.g. to a game stat website. The user may vet or preconfigure a list of websites from which the application can automatically source additional content.

There are other integrations possible utilizing this same technology as many APIs are available for the application to utilize. For example, Weather.com has a published API that many current applications utilize for current weather information. Yahoo and Google have published APIs for many various categories including news, weather, sports, etc. For example, based on time photo was taken, the application can provide weather info.

In another embodiment, the application automatically tags the user's photos (either on the desktop or the mobile device) utilizing face recognition software currently available today. When a picture is submitted into the application, the application automatically seeks other photos that have similar tags, and when a photo is presented in the application, present similar tagged photos as well or provide a link to these photos. Knowing where the user is, the application can also look for other tagged photos relating to the location of the user. For instance, if a user takes a photo while at a Yankee's game, the application can also provide any other photos or a link to these photos that have either the tag "baseball", or "Yankee Stadium", etc.

Interacting with the APIs of third party software available today (for example, the face recognition program currently on the market by face.com) the application automatically tags any individuals in new photos introduced into the application if that person has already been tagged previously by the user. In the above example, the photo taken at the Yankee stadium can have the following tag: "This photo of Dave, Rob and Pam was taken during the 6th inning at Yankee Stadium with the Yankees ahead 4-2 and Derek Jeter at bat."

As will be apparent from the foregoing, the components of the system 100 may be embodied in hardware, software, firmware or a combination of hardware, software and/or firmware. In a hardware embodiment, the application may be executed on a processor of a personal computing device 103 of the user (FIG. 1). The processor may be operatively associated with a memory and may communicate with other processors, such as a processor of a remote system through a communications link, such as an internet link, FTP link, cellular link, and the like.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method of automatically generating content entries for a user account comprising:
   processing, by a processor of a user device, user input data of a user comprising at least one of local user data and remote user data to determine one or more current interests of the user;
   automatically determining, by the user device, a user account relating to at least one of the current interests, wherein the user account is at least one of a blogging account, a real time messaging service account and a social media account, and wherein the user account is viewable by one or more secondary users;
   automatically generating, by the user device, a new content entry pertaining to the current interest from the user input data, the new content entry comprising supplemental text information newly generated by the user device from the user input data; and
   automatically posting, by the user device, the content entry including the supplemental text information to the user account;
   wherein the steps of processing, automatically determining and automatically generating are performed by the user device without additional input from the user;
   wherein determining one or more current interests comprises:
      maintaining a permanent user interest file including a plurality of content categories that satisfy a time and frequency weighted threshold requirement at a first time;
      generating a temporary user interest file by tokenizing the user input data having a timestamp later than first time to determine a plurality of temporary content categories;
      merging the temporary user interest file with the permanent user interest file based on referencing a historical topic data file;
      updating the permanent user interest file by applying the weighted threshold requirement to remove content categories from the permanent user interest file that no longer satisfy the time and frequency weighted threshold requirement and adding content categories that do satisfy the time and frequency weighted threshold requirement; and
      obtaining the current interests from the updated permanent user interest file.

2. The method of claim 1 comprising generating a content entry for each content category that satisfies the threshold requirement.

3. The method of claim 1 wherein generating a content entry comprises extracting content for the content entry from the user data relating to the content category.

4. The method of claim 3 wherein the content comprises a photo.

5. The method of claim 1 wherein the user account comprises a user account of a real-time messaging service.

6. The method of claim 5 comprising:
   determining one or more recipients to whom the user has communicated in respect of the current interest; and
   generating a message to one or more of the recipients comprising the new content entry.

7. The method of claim 1 wherein the user account comprises a blog.

8. The method of claim 1 wherein generating the content entry utilizes a published API for the medium associated with the user account.

9. The method of claim 1 wherein generating the content entry comprises:
   determining a third party information source pertaining to the current interest;
   accessing data from the third party information source; and
   including accessed data from the third party information source in the content entry.

10. The method of claim 9 wherein the accessed data is dependent on a time of the user data used in determining the current interest.

11. The method of claim 1 comprising:
    performing a scan of the user data since a previous scan;
    determining temporary interests since the previous scan; and
    merging the temporary interests with previously determined current interests.

12. The method of claim 1 wherein determining a user account comprises determining a category of the current interest and determining the user account using the category.

13. A communications enabled device executing an application on at least one processor of the device, the application configured to:
    maintain an association between one or more topics of interest of a user and one or more user accounts;
    process, via the at least one processor without further input from the user, user input data of the user comprising at least one of local user data and remote user data to determine a current interest of the user;
    determine, via the at least one processor without further input from the user, a user account associated with the current interest via a reference of the maintained association, wherein the user account is at least one of a blog account, a real time message service account and a social media account, and wherein the user account is viewable by one or more secondary users;
    automatically generate without further input from the user, via the at least one processor, a new content entry pertaining to the current interest from the user input data, the new content entry comprising supplemental text information newly generated by the user device from the user input data; and
    automatically provide, via the at least one processor, the content entry comprising the supplemental text information to the determined user account;

wherein the current interest being determined comprises:

a permanent user interest file being maintained including a plurality of content categories that satisfy a time and frequency weighted threshold requirement at a first time;

a temporary user interest file being generated via tokenization of the user input data that has a timestamp later than first time to determine a plurality of temporary content categories;

the temporary user interest file being merged with the permanent user interest file based on referencing a historical topic data file;

the permanent user interest file being updated via an application of the weighted threshold requirement to remove content categories from the permanent user interest file that no longer satisfy the time and frequency weighted threshold requirement and content categories being added that do satisfy the time and frequency weighted threshold requirement; and the current interests being obtained from the updated permanent user interest file.

14. The device of claim 13 wherein the application is configured to maintain the association between one or more topics of interest of a user and one or more user accounts in at least one topic data file.

15. The device of claim 14 wherein the at least one topic data file stores an association between one or more topics and one or more external users and wherein the application is configured to:

determine a recipient of the content entry via a reference of the at least one topic data file; and provide the content entry to the determined recipient through the determined user account.

* * * * *